(12) United States Patent
Kaemmerer et al.

(10) Patent No.: US 8,713,926 B2
(45) Date of Patent: May 6, 2014

(54) HYDRODYNAMIC MACHINE, ESPECIALLY A HYDRODYNAMIC RETARDER

(75) Inventors: Steffen Kaemmerer, Crailsheim (DE); Rainer Schips, Ellwangen (DE); Bernd Horlacher, Obersontheim (DE)

(73) Assignee: Voith Patent GmbH, Heidenheim (DE)

( * ) Notice: Subject to any disclaimer, the term of this patent is extended or adjusted under 35 U.S.C. 154(b) by 0 days.

(21) Appl. No.: 13/560,504

(22) Filed: Jul. 27, 2012

(65) Prior Publication Data

US 2013/0186079 A1 Jul. 25, 2013

Related U.S. Application Data

(63) Continuation of application No. PCT/EP2011/000304, filed on Jan. 25, 2011.

(30) Foreign Application Priority Data

Jan. 29, 2010 (DE) .......................... 10 2010 006 332

(51) Int. Cl.
*F16D 33/00* (2006.01)
(52) U.S. Cl.
USPC .......................................................... 60/330
(58) Field of Classification Search
USPC ............ 60/330, 331, 333, 341, 364; 188/290; 416/180, 197 R, 197 C, 223 R
See application file for complete search history.

(56) References Cited

U.S. PATENT DOCUMENTS

| | | | |
|---|---|---|---|
| 2,126,751 A | 1/1936 | DeLaMater |
| 2,889,013 A | 6/1959 | Schneider |
| 3,547,235 A | 12/1970 | Weinrich |
| 5,147,181 A | 9/1992 | Klemen |

FOREIGN PATENT DOCUMENTS

| | | | |
|---|---|---|---|
| DE | 2 239 562 A1 | 2/1974 |
| DE | 195 44 190 B4 | 11/2005 |
| DE | 10 2010 006 332 A1 | 8/2011 |
| GB | 663 463 | 12/1951 |

OTHER PUBLICATIONS

International Search Report dated Apr. 20, 2011, and Written Opinion of the International Searching Authority, for International Application No. PCT/EP2011/000304 (9 pages).
International Preliminary Report on Patentability dated Mar. 19, 2012 for International Application No. PCT/EP2011/000304 (5 pages).

(Continued)

*Primary Examiner* — Michael Leslie
(74) *Attorney, Agent, or Firm* — Taylor IP, P.C.

(57) ABSTRACT

A hydrodynamic machine has two blade wheels disposed opposite each other and together forming a toroidal working space. The space can be filled with a working medium to transmit torque hydrodynamically, by circulating the working medium in the space, from the first to the second blade wheel. The first blade wheel rotates about an axis of rotation. The second blade wheel rotates about the same axis of rotation in the same rotation direction as the first blade wheel or opposite thereto, or is held stationary. The blades of each blade wheel extend in an arc from a radially inner blade end on a radially inner wall of the working space to a radially outer blade end on a radially outer wall of the working space, and in plan view in the direction of the rotation axis the arc is in the shape of a circular arc on each blade wheel.

7 Claims, 1 Drawing Sheet

(56) References Cited

OTHER PUBLICATIONS

Communication from from the German Patent and Trademark Office dated Dec. 15, 2010 for DE 10 2010 006 332.0-12 (3 pages).
English translation of International Search Report dated Apr. 20, 2011 for PCT/EP2001/000304 (2 pages).
International Preliminary Report on Patentability dated Mar. 19, 2012 for International Application No. PCT/EP2011/000304 (6 pages).
Written Opinion of the International Searching Authority for PCT/EP2011/000304 (4 pages).

HYDRODYNAMIC MACHINE, ESPECIALLY A HYDRODYNAMIC RETARDER

CROSS REFERENCE TO RELATED APPLICATIONS

This is a continuation of PCT application No. PCT/EP2011/000304, entitled "HYDRODYNAMIC MACHINE, IN PARTICULAR A HYDRODYNAMIC RETARDER", filed Jan. 25, 2011, which is incorporated herein by reference.

BACKGROUND OF THE INVENTION

1. Field of the Invention

The present invention relates to a hydrodynamic machine, especially a hydrodynamic retarder, comprising two blade wheels which are opposite of one another in such a way that they jointly form a toroidal working chamber which can be filled with a working medium in order to hydrodynamically transfer torque by way of a cycle flow of the working medium in the working chamber from the first blade wheel to the second blade wheel, wherein the first blade wheel rotates about a rotational axis and the second blade wheel rotates about the same rotational axis in the same direction of rotation or opposite of the direction of rotation of the first blade wheel, or is held in a stationary manner, and the blades of each blade wheel extend in an arc from a radially inner blade end on a radially inner wall of the working chamber to a radially outer blade end on a radially outer wall of the working chamber.

2. Description of the Related Art

Hydrodynamic machines comprise at least two bladed wheels, which will be referred to below as blade wheels and which jointly form a toroidal working chamber. One distinguishes between such hydrodynamic machines which comprise precisely two blade wheels for forming the working chamber, namely hydrodynamic couplings and hydrodynamic retarders, and such hydrodynamic machines in which additionally fixed or fixable guide blade assemblies are provided in the working chamber, so-called hydrodynamic converters. The present invention relates especially to the former hydrodynamic machines with precisely two blade wheels, and especially to hydrodynamic retarders in which drive power or torque is transferred from a first revolving blade wheel to a second fixed blade wheel or from a first revolving blade wheel to a second blade wheel revolving in the opposite direction in relation to the first blade wheel in order to brake the first blade wheel.

In vehicle drive trains in which the present invention is applicable, such hydrodynamic machines, and hydrodynamic retarders in particular, are widely used which comprise two blade wheels with blades having a planar blade profile and are opposite of each other in the axial direction in order to form the toroidal working chamber. The mutually facing free axial ends of the blades, which are also known as front edges of the blade, are usually straight and extend in the radial direction of the respective blade wheel. In order to amplify power transmission in a direction of rotation of the hydrodynamic machine, it is further proposed to provide the blade wheels with an oblique blading, such that the blades are arranged in the aforementioned direction of rotation in a piercing manner with respect to each other. This does not change anything in respect of the straight progression of the front edges of the blade in the radial direction of the blade wheel. It has further already been proposed to arrange the blades in a twisted fashion in order to integrally produce the blade wheel by way of casting in a manner so that the same can rotationally be demolded. The straight progression of the front edges of the blade in the direction of the blade wheel will not be affected thereby.

U.S. Pat. No. 5,147,181 describes a blade profile which differs completely from the one described above. In this case, the blades extend in an arc from a radially inner wall of the toroidal working chamber up to a radially outer wall of the working chamber. In accordance with this specification, it is relevant for the guidance of the flow of the hydrodynamic cycle flow in the working chamber that the arc is provided with a very specific parabolic shape.

The published patent application DE 2 239 562 A describes a hydrodynamic brake with similar arc-shaped blades, which comprise circular intersecting lines between the inside surfaces of the blades and the inside surface of the cycle shell in a top view obliquely on the plane of the separating gap between the two blade wheels. The arc of the blades has the shape of an ellipse in a view in the direction of the rotational axis on the blade wheel.

Document U.S. Pat. No. 2,126,751 A describes linear front edges of the blades which are inclined relative to the radial direction on the one hand and front edges of the blade on the other hand which have a slight arc shape in a top view of the plane of the separating gap. Respective shapes of blades are also shown by the document GB 663 463 A. U.S. Pat. No. 2,889,013 A proposes the provision of cup-shaped blades in form of hollow spherical segments.

Although hydrodynamic machines with a large variety of blade profiles are known, there is a continued need to achieve an optimum concerning the efficiency in combination with low production costs and high reliability. A further important feature is the progression of the efficiency over various speeds or at different degrees of filling (filling states in operation between full filling and minimum filling) of the working chamber.

The present invention is based on the object of providing, and what is needed in the art is, a hydrodynamic machine, especially a hydrodynamic retarder, which fulfills the mentioned requirements even better than previously known embodiments. In particular, high efficiency is to be achieved in combination with potential cost-effective production of the hydrodynamic machine or the hydrodynamic retarder, which occurs advantageously with a favorable progression of the efficiency at different speeds and different filling states of the working chamber.

SUMMARY OF THE INVENTION

The object in accordance with the invention is achieved by, and the present invention provides, a hydrodynamic machine, especially a hydrodynamic retarder, which advantageously comprises precisely two blade wheels. The hydrodynamic machine, especially a hydrodynamic retarder, comprises two blade wheels which are opposite of one another in such a way that they jointly form a toroidal working chamber which can be filled with a working medium in order to hydrodynamically transfer torque by way of a cycle flow of the working medium in the working chamber from the first blade wheel to the second blade wheel, wherein the first blade wheel rotates about a rotational axis and the second blade wheel rotates about the same rotational axis in the same direction of rotation or opposite of the direction of rotation of the first blade wheel, or is held in a stationary manner, and the blades of each blade wheel extend in an arc from a radially inner blade end on a radially inner wall of the working chamber to a radially outer blade end on a radially outer wall of the working chamber, characterized in that the blades are disposed perpendicularly to a plane which forms a separating gap between the two blade wheels and on which the rotational axis stands perpendicularly, and extend in the direction of the rotational axis, and the arc has the shape of an arc in a top view of each blade wheel in the direction of the rotational axis.

The hydrodynamic machine in accordance with the invention, which is arranged especially as a hydrodynamic retarder, comprises at least two blade wheels which are arranged opposite of one another in such a way that they jointly form a toroidal working chamber in which the blades of the blade wheels are positioned. The working chamber can be filled with a working medium or it can also be filled permanently according to one embodiment, in the case that the drive of the hydrodynamic machine can be switched off for deactivating the first blade wheel, in order to transfer torque by means of a cycle flow of the working medium in the working medium chamber in a hydrodynamic manner from the first blade wheel to the second blade wheel. As the person skilled in the art is well aware, the working medium is accelerated in the working chamber radially to the outside by the blades of the first blade wheel, enters the opposite second blade wheel, is delayed radially to the inside there and enters the first blade wheel radially to the inside again. As a result of this cycle transfer, the desired transfer of torque or drive power is performed.

In some hydrodynamic machines, especially those that are arranged as hydrodynamic converters, the blades can also be positioned in a manner that deviates from the arrangement in the working chamber as described above, so that the inlet or outlet of the cycle flow into or out of the blades of the first blade wheel and the second blade wheel can come to lie on a different diameter.

In accordance with the invention, at least the first blade wheel rotates about a rotational axis. In an embodiment as a hydrodynamic coupling or as a hydrodynamic converter, the second blade wheel rotates about the same rotational axis in the same direction of rotation as the first blade wheel. In the case of an embodiment as a hydrodynamic retarder, the second blade wheel is stationary or is driven from the outside against the direction of rotation of the first blade wheel about the same rotational axis in order to form a counter-rotating retarder.

The blades of each blade wheel extend according to the initially mentioned U.S. Pat. No. 5,147,181 in an arc from a radially inner blade end on a radially inner wall of the working chamber to a radially outer blade end on a radially outer wall of the working chamber.

In accordance with the invention, the arc in which the blades extend from their radially inner blade end to their radially outer blade end has the shape of a circular arc in a top view in the direction of the rotational axis of each blade wheel. This shape of the circular arc is therefore at least obtained when seen from the separating gap onto each blade wheel.

Advantageously, the radially inner blade end and the radially outer blade end are positioned on a blade on a (theoretical) straight line which stands perpendicularly to the rotational axis and thus extends through the central point of the blade wheel.

In accordance with the invention, the blades are disposed perpendicularly to a plane which extends through the separating gap between the two blade wheels, and extend in the direction of the rotational axis which stands perpendicularly to the mentioned plane through the separating gap. The shape of the arc is advantageous in which the blades extend from their radially inner blade end to their radially outer blade end, and/or the blade cross-section is substantially or completely identical in each axial section relating to the rotational axis of the hydrodynamic machine through the blades when the axial sections are drawn in the direction of the rotational axis behind one another and in parallel planes. One could therefore also describe the blades as cylinder segments disposed perpendicularly on the separating gap.

Since the blades have a certain blade thickness, the definition of the arc over which the blades extend from their radially inner blade end to their radially outer blade end can be chosen in various ways. The arc is formed by the central line of the blade according to a first definition assumed here. The central line of the blade is a theoretical line which on each of its points has an identical distance from the blade surfaces which extend on both sides of the central line of the blade and are arranged opposite of one another, relating to the radius of the central line of the blade. In other words, the central line of the blade is formed by each central point between two opposite tangents on the surfaces of the blades facing away from one another.

Another possible definition refers the arc to one of the two blade surfaces.

The two mentioned definitions are identical with respect to the arc-like progression of the blades when the blades have a constant blade thickness over the radius of the blade wheel. It is preferable however that the blades, especially originating from the region of their apex, which means their central point on one of their blade surfaces, taper in their cross-section towards the radially inner and radially outer blade end.

The front edges of the blades of the two blade wheels which face one another, i.e. the free axial ends of the blades which face one another in the direction of the rotational axis, advantageously have a convex bent shape, as seen in an axial sectional view along the rotational axis. It is understood that other shapes of arcs such as an S-shaped arc or a concave arc are possible for example.

In accordance with one embodiment, the blades of the first blade wheel and the blades of the second blade wheel have a profile which is identical with respect to each other, wherein the number of the blades per blade wheel can differ from one another however. Furthermore, it is possible according to a first alternative that all blades of one and the same blade wheel have a blade profile which is identical with respect to one another. According to a second alternative, the blade wheels of one and the same blade wheel have profiles which differ from one another, but these different profiles can also be found in the other blade wheel in the described advantageous embodiment.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 1:
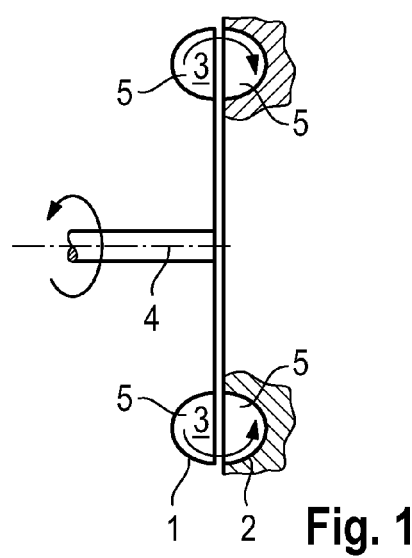
FIG. 1 shows a schematic axial sectional view through a hydrodynamic retarder.

FIG. 1 shows a hydrodynamic retarder in a schematic illustration, comprising a revolving first blade wheel 1 and a stationary second blade wheel 2. The two blade wheels 1, 2 jointly form a toroidal working chamber 3, in which the blades 5 of the respective first blade wheel 1 and the second blade wheel 2 are positioned.

The blade wheel 1 rotates via the rotational axis 4, by means of which the working medium is accelerated radially to the outside and forms a cycle flow in the working chamber 3 (see the arrows in working chamber 3).

Figure 2:
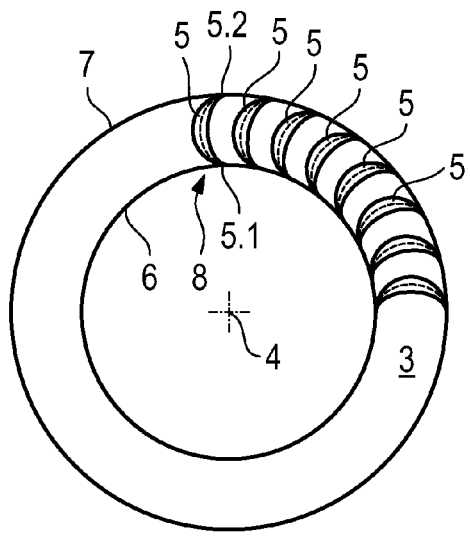
FIG. 2 shows a top view in the direction of the rotational axis on a blade wheel of the retarder according to FIG. 1.

As is shown in FIG. 2, the blades 5 have the shape of an arc 8 in a top view in the direction of the rotational axis 4, which arc extends from a radially inner wall 6 of the working chamber 3 to a radially outer wall 7 of the working chamber 3. The radially inner blade end 5.1 rests on the radially inner wall 6, and the radially outer blade end 5.2 rests on the outer wall 7.

As is shown in FIG. 3 again on an enlarged scale, the arc 8 forms a circular arc. Another curved shape would also be possible, e.g. the shape of a parabola. Since the cross-section of blade 5 tapers in this case from the region of its apex 5.3 towards the radially inner blade end 5.1 and the radially outer blade end 5.2, the arc 8 is formed in its arc shape precisely through the central line 11 of the blade. The central line 11 of the blade has an identical distance from the blade surfaces arranged on either side of the same or from the tangents which extend on these surfaces, with the path of the shortest distance being perpendicular to said tangents, as shown with the illustrated arrows.

Figure 3:
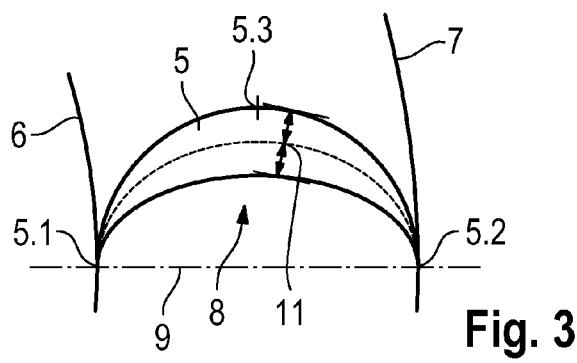
FIG. 3 shows the arc shape of the blades of the top view according to FIG. 2 in an enlarged view.

The radially inner blade end 5.1 and the radially outer blade end 5.2 are positioned on a straight line 9 which is perpendicular to the rotational axis 4 (not shown in FIG. 3).

Figure 4:
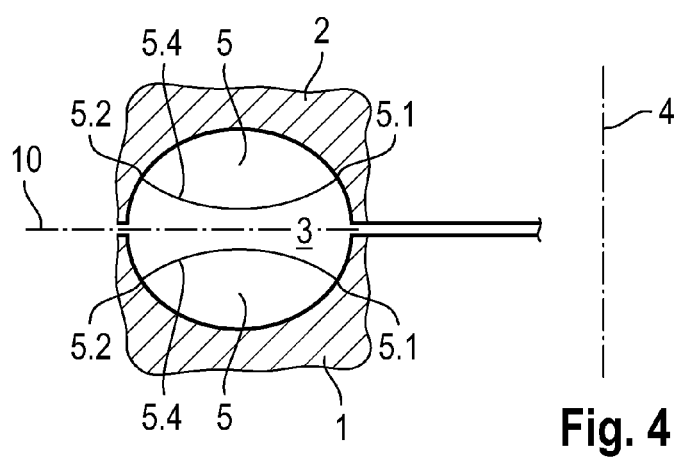
FIG. 4 shows an enlarged schematic illustration in an axial sectional view through the toroidal working chamber with the progression of the front free blade ends (front end of blade).

As is shown in FIG. 4, the free axial ends 5.4 of the blades 5 which face one another in the axial direction of the hydrodynamic retarder have a convex arc shape, as seen in an axial sectional view along the rotational axis 4 and as shown in FIG. 4.

FIG. 4 further shows the plane 10 which extends through the separating gap between the two blade wheels 1, 2 and on which the blades 5 especially stand perpendicularly, at least in the region of their free axial end or over their entire axial extension.

Although the arc 8 of each blade 5 extends in the illustrated embodiment over 180°, larger or smaller lengths of the arc can generally be considered, especially in a range of between 120° to <180° or >180° to 195°.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A hydrodynamic machine, comprising:
a first blade wheel including a plurality of blades; and
a second blade wheel including a plurality of blades, said first blade wheel and said second blade wheel being opposite one another in such a way that said first blade wheel and said second blade wheel jointly form a toroidal working chamber which is configured for being filled with a working medium in order to hydrodynamically transfer a torque by way of a cycle flow of said working medium in said working chamber from said first blade wheel to said second blade wheel, said first blade wheel configured for rotating about a rotational axis in a direction of rotation, said second blade wheel one of (a) configured for rotating about said rotational axis one of (i) in said direction of rotation of said first blade wheel and (ii) opposite said direction of rotation of said first blade wheel, and (b) being held in a stationary manner, said working chamber including a radially inner wall and a radially outer wall, each of said plurality of blades of each of said first blade wheel and said second blade wheel including a radially inner blade end and a radially outer blade end, said plurality of blades of each of said first blade wheel and said second blade wheel extending in an arc from said radially inner blade end on said radially inner wall of said working chamber to said radially outer blade end on said radially outer wall of said working chamber, said plurality of blades of each of said first blade wheel and said second blade wheel being disposed perpendicularly to a plane which forms a separating gap between said first blade wheel and said second blade wheel and on which said rotational axis stands perpendicularly, said plurality of blades of each of said first blade wheel and said second blade wheel extending in a direction of said rotational axis, said arc having a circular arc shape in a top view of each of said first blade wheel and said second blade wheel in said direction of said rotational axis.

2. The hydrodynamic machine according to claim 1, wherein the hydrodynamic machine is a hydrodynamic retarder.

3. The hydrodynamic machine according to claim 1, wherein said radially inner blade end and said radially outer blade end of a respective one of said plurality of blades of each of said first blade wheel and said second blade wheel are positioned on a straight line which stands perpendicularly to said rotational axis.

4. The hydrodynamic machine according to claim 1, wherein said arc is formed by a central line of a respective one of said plurality of blades of each of said first blade wheel and said second blade wheel, said respective one of said plurality of blades having a plurality of surfaces, said central line extending through each central point between two opposite tangents on said plurality of surfaces of said respective one of said plurality of blades facing away from one another, said plurality of blades of each of said first blade wheel and said second blade wheel each tapering respectively in a cross section of said plurality of blades to said radially inner blade end and said radially outer blade end.

5. The hydrodynamic machine according to claim 1, wherein said plurality of blades of each of said first blade wheel and said second blade wheel each has an apex and a region of said apex, said plurality of blades of each of said first blade wheel and said second blade wheel each tapering respectively in a cross section of said plurality of blades starting from said region of said apex to said radially inner blade end and said radially outer blade end.

6. The hydrodynamic machine according to claim 1, wherein said plurality of blades of each of said first blade wheel and said second blade wheel have a plurality of free axial ends which face one another in said direction of said rotational axis and have a convex arc shape, as seen in an axial sectional view along said rotational axis.

7. The hydrodynamic machine according to claim 1, wherein said plurality of blades of said first blade wheel and said plurality of blades of said second blade wheel have a profile which is identical with respect to each other.

\* \* \* \* \*